United States Patent [19]
Kimon et al.

[11] 4,412,598
[45] Nov. 1, 1983

[54] PERSONNEL TRANSFER APPARATUS AND METHOD

[75] Inventors: Peter M. Kimon, Mendham, N.J.; Yves Bertrand, Paris, France

[73] Assignee: Exxon Research and Engineering Co., Florham Park, N.J.

[21] Appl. No.: 372,651

[22] Filed: Apr. 28, 1982

Related U.S. Application Data

[63] Continuation-in-part of Ser. No. 227,708, Jan. 23, 1981.

[51] Int. Cl.[3] .................... B65G 67/58; E04G 3/10; B66D 1/48

[52] U.S. Cl. .................... 182/19; 182/142; 414/139

[58] Field of Search .................... 182/19, 142, 150, 36, 182/37, 143, 144; 414/137, 138, 139; 114/221 R, 268

[56] References Cited

U.S. PATENT DOCUMENTS

| | | | |
|---|---|---|---|
| 895,008 | 8/1908 | German | 182/115 |
| 956,204 | 4/1910 | Sivard . | |
| 1,100,571 | 6/1914 | Johansen . | |
| 1,128,656 | 2/1915 | Broady . | |
| 1,237,085 | 8/1917 | Oliver . | |
| 1,257,664 | 2/1918 | Ashe . | |
| 1,306,645 | 6/1919 | Torrie . | |
| 1,329,921 | 2/1920 | Mills | 114/373 |
| 1,534,049 | 4/1925 | Allbin | 114/373 |
| 1,794,302 | 2/1931 | Kipling | 114/373 |
| 1,804,945 | 5/1931 | Miller | 114/268 |
| 2,016,838 | 10/1935 | Schat | 9/22 |
| 2,173,421 | 9/1939 | Krzeminsky | 9/22 |
| 2,622,251 | 12/1952 | Dodgson | 9/37 |
| 2,761,571 | 9/1956 | Adams | 214/15 |
| 2,998,148 | 8/1961 | Himel | 182/73 |
| 3,092,856 | 6/1963 | Wallace et al. | 9/39 |
| 3,648,858 | 3/1972 | Barron | 414/139 |
| 3,654,869 | 3/1972 | Lehrer | 414/138 |
| 3,675,900 | 7/1972 | Barron | 414/139 |
| 3,804,268 | 4/1974 | Barron | 414/139 |
| 4,132,387 | 1/1979 | Somerville | 414/139 |
| 4,145,782 | 3/1979 | De Sepio et al. | 9/30 |
| 4,180,362 | 12/1979 | Stair | 414/139 |
| 4,324,385 | 4/1982 | Cojean | 414/139 |

OTHER PUBLICATIONS

Yo-Yo Boat Winch with Self-Tensioning and Rendering Fall, Schat Davits Ltd., London, Great Britain.

*Primary Examiner*—Reinaldo P. Machado
*Attorney, Agent, or Firm*—Robert S. Salzman; Donald F. Wohlers

[57] ABSTRACT

A system is disclosed for safely transferring personnel to and from a sea launch from and to a tanker, a freighter, a bulk carrier, passenger ship or any other vessel or platform relatively larger than the launch or a boat. The system comprises a carrier, which is lifted and lowered by a winch including a hoisting motor, a continuously running tensioning motor, at least one cable connected to said carrier and operatively connected to the tensioning motor and the hoisting motor, and a coupling device disposed between the hoisting motor and the tensioning motor. A weight, which is part of the carrier, or which is suspended underneath, or, alternately, a line attached to the launch and carrier, provides the necessary compensation to the changing personnel weight and allows the carrier to follow motion of the moving deck of the launch.

22 Claims, 4 Drawing Figures

PERSONNEL TRANSFER APPARATUS AND METHOD

CROSS-REFERENCE TO RELATED APPLICATIONS

This application is a continuation-in-part of Ser. No. 227,708, filed Jan. 23, 1981, which is based on P.M. EIC-1-79.

FIELD OF THE INVENTION

The subject invention relates to apparatus and method for transferring personnel from one sea vessel to another sea vessel, and more particularly to a personnel transferring apparatus which hoists personnel from the deck of a launch moving up and down under the influence of the sea, to another substantially stable deck and vice versa.

BACKGROUND OF THE INVENTION

The transfer of personnel from a small boat, such as a sea launch, to a larger sea vessel, such as a passenger ship or tanker, has always posed a safety problem in heavy seas. The smaller boat or launch is pitching, rolling and heaving under the influence of the sea, while the larger ship is generally less affected by the sea motion. The resulting disparity in the relative vertical motions of the two vessels causes boarding and disembarking accidents, as personnel attempt to embark or disembark fluctuating decks and oscillating platforms.

The problem of safely transferring personnel at sea has been one which, heretofore, has not been successfully solved.

The subject invention offers a solution to the above-mentioned problem, which solution is achieved in a very simple and unique manner.

BRIEF DISCUSSION OF RELATED ART

A self tensioning "yo-yo" boat winch is commercially available from Schat Davits Ltd., London, England. This "yo-yo" boat which is capable of lowering a launch or smaller boat from the deck of a larger vessel in rough seas. While this winch features a self-tensioning mechanism, it does not provide for balancing the vertical motion of a personnel carrier with respect to the vertical fluctuations of the launch while disposed in the sea.

BRIEF SUMMARY OF THE INVENTION

This invention pertains to a personnel transfer method, apparatus or system which safely transfers passengers to and from the deck of a launch, from and to the deck of a tanker or other large sea vessel.

The apparatus comprises a carrier means such as a gondola, platform, chair or a pilot ladder suspended by a hoisting cable. The gondola is lowered via said cable by winch to the deck of the launch from the deck of the tanker, in order to receive or disembark passengers or other personnel. The winch comprises of two motors: a hoisting motor associated with a brake lowering device, capable of handling the full load of the transfer platform, and a continuously running, tensioning motor. The weight of the gondola, with or without personnel, is constantly being subjected to a hoisting force by means of the continuously running tensioning motor. This motor cannot lift or hoist the gondola by itself, but rather acts to keep the gondola in a motion balanced mode. A weight cabled to the underside of the gondola rests upon the fluctuating deck of the pitching sea launch. This weight is supported by the deck to a varying degree as the deck is caused to vertically shift. An alternative to the weight is a line connecting the deck of the launch to a quick-release hook on the underside of the gondola. The tension in this line varies as the deck shifts vertically. As a result, the hoisting cable would normally experience a variation in its hoisting tension. The tension in the hoist cable is kept constant, however, by the constantly running tensioning motor, which takes up any slack in the cable during any decrease in line tension, or pays out the cable during any increase in line tension.

The constant tensioning in the cable has the result that the gondola will follow the motion of the fluctuating deck of the launch (operating in a balanced motion mode). Therefore, the relative motion of the gondola with respect to the deck of the launch will be substantially zero. This will allow the passengers to easily embark to, or disembark from, the fluctuating deck.

When personnel climb on board the gondola or disembark from it, the tension in the cables is maintained constant by the tensioning motor.

When all the passengers are on board the gondola, a second or hoisting motor is mechanically coupled into the drive train of the hoisting apparatus. The passengers are then lifted to the deck of the tanker or other passenger ship. The frame of the hoisting apparatus may be constructed as two cable supporting davits. The gondola may also comprise a ladder. When the gondola can be landed on the deck of the launch, the weight may be part of the gondola itself.

The method of transferring personnel at sea of this invention comprises the steps of:

(a) lowering by cable from a ship a personnel carrier to the fluctuating deck of a sea launch subject to the motion of the sea;

(b) keeping said cable in substantially constant tension, while transferring personnel via said personnel carrier, whereby said personnel carrier will follow the fluctuations of said deck during loading or unloading; and (c) hoisting said personnel carrier to the deck of said passenger ship.

For purposes of definition "hoisting mode" shall mean either raising or lowering of the personnel carrier, and "balanced motion mode" shall mean operating the personnel transfer mechanism so that the personnel carrier shall substantially follow the vertical motion of the launch as it fluctuates up and down in the sea.

It is an object of this invention to provide an improved personnel transfer apparatus and method;

It is another object of the invention to provide a personnel transfer apparatus and method which will be safer by allowing an easier embarcation and disembarcation of personnel at sea.

These and other objects of this invention will be better understood and will become more apparent with reference to the following detailed description considered in conjunction with the accompanying drawings.

DETAILED DESCRIPTION OF THE INVENTION

Generally speaking, the invention seeks to safely load or unload passengers into or from a personnel carrier which is first lowered from a tanker or passenger ship to the fluctuating deck of a pitching sea launch. The cable suspending the personnel carrier is held in substantially constant tension as passengers embark to or disembark from, the personnel carrier. The personnel carrier will follow the fluctuation of the moving deck during loading or unloading. After all the passengers are safely on board the personnel carrier, it is hoisted to the deck of the larger vessel.

Figure 1A:
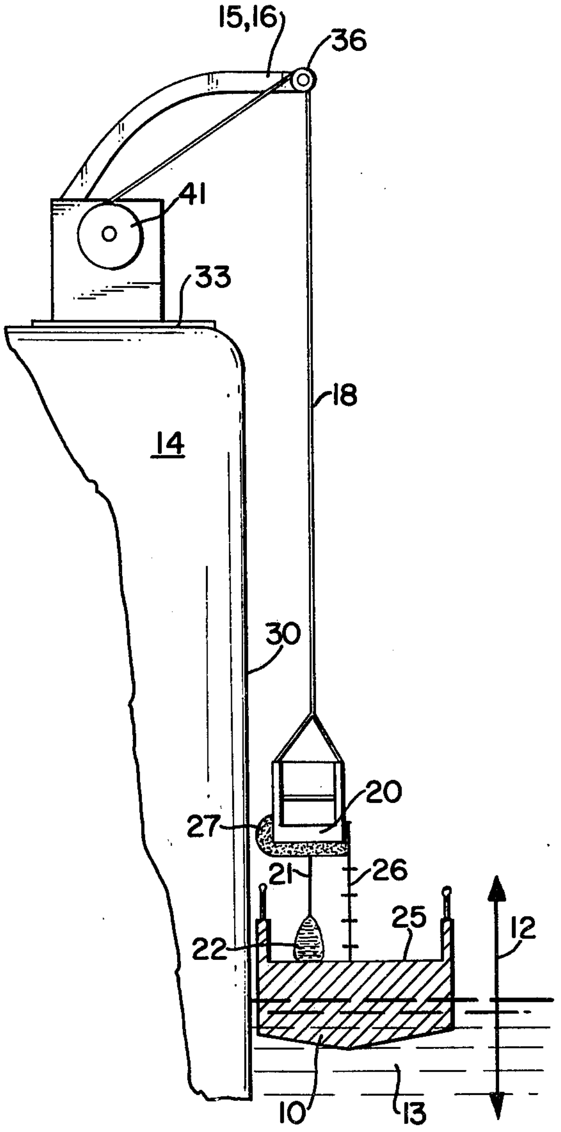
FIG. 1*a* is a schematic side view of this invention.
Figure 1B:
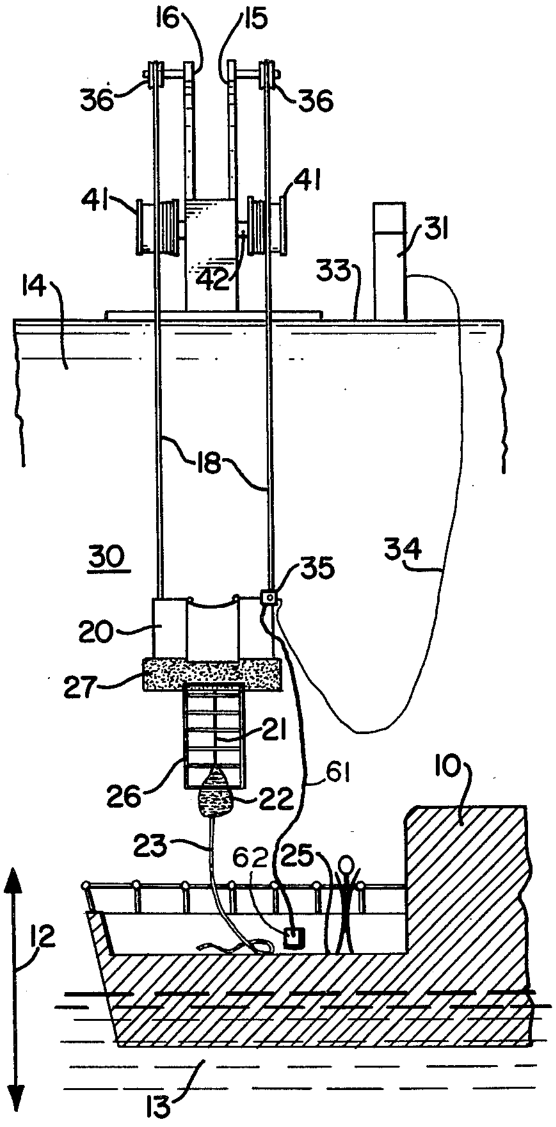
FIG. 1*b* is a schematic front view of the invention.

Now referring to FIGS. 1*a* and 1*b*, a side and front view of a sea launch 10 is shown pitching up and down (arrows 12) in the sea 13 adjacent a larger vessel 14.

Two davits 15 and 16 respectively are disposed upon the deck 33 of the vessel 14. These davits each support a cable 18 via a pulley 36, which in turn supports a personnel carrier or gondola 20. A weight 22 extends from the bottom of the gondola 20 by means of cable 21.

Figure 3A:
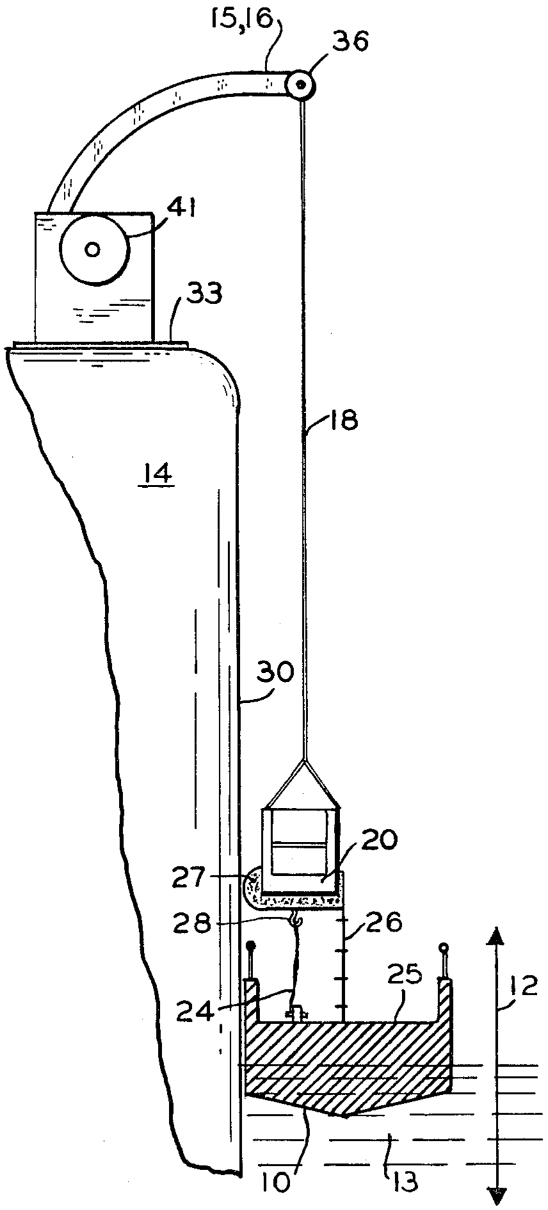
FIG. 3*a* is a schematic side view of the invention with an alternative attached line.
Figure 3B:
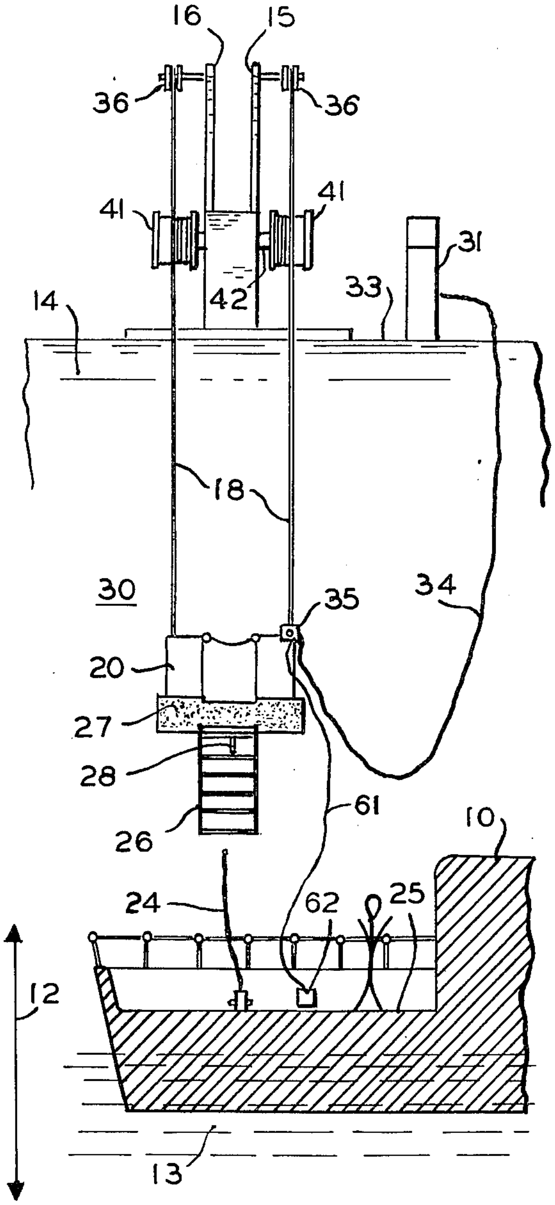
FIG. 3*b* is a schematic front view of the invention with an alternative attached line.

Referring to FIGS. 3*a* and 3*b*, an alternative line 24 which extends from the deck 25 of launch 10 is attached to the quick-release hook 28 on the bottom of gondola 20. In each embodiment, however, the effect of the line 21 or line 24 going slack as the gondola 20 approaches too close to the deck is to control the motion balancing means to raise the gondola. Conversely, when lines 21 or 24 are placed in substantial tension so as to apply an increased downward load on the gondola, the motion balancing means will be signaled to lower the gondola toward the deck of the launch.

An optional rope 23 (FIG. 1*b*) extends from weight 22, which is used by deckhands for guiding the weight 22 and the gondola 20 over an appropriate area of the deck 25 of launch 10, when the personnel carrier is lowered from the tanker 14.

The gondola 20 may also have a ladder 26 extending from the underside thereof, and generally having the same length as the cable and weight 21 and 22 (FIGS. 1*a* and 1*b*) or line 24 (FIGS. 3*a* and 3*b*). This insures that the ladder 26 will extend to the surface of the deck 25 of the launch, when the weight 22 is resting on the deck 25 with cable 21 in a taut position (FIG. 1*a*) or line 24 in a taut position (FIG. 3*a*).

The gondola 20 may also be fitted with a flexible bumper 27 to absorb lateral impacts against the tanker hull 30.

A control panel 31 disposed on deck 33 of the tanker 14 can be operated by a deckhand to lower and raise the gondola 20. A wire 34 (FIG. 1*b*) connects to a switch 35 disposed on the gondola 20, so that a lift operator standing in the gondola can alternatively operate the transfer device. As another alternate, wire 61 having switch 62 is connected to switch 35 and extends down to the deck of the launch, so that a person boarding from the launch can operate the transfer device.

Figure 2:
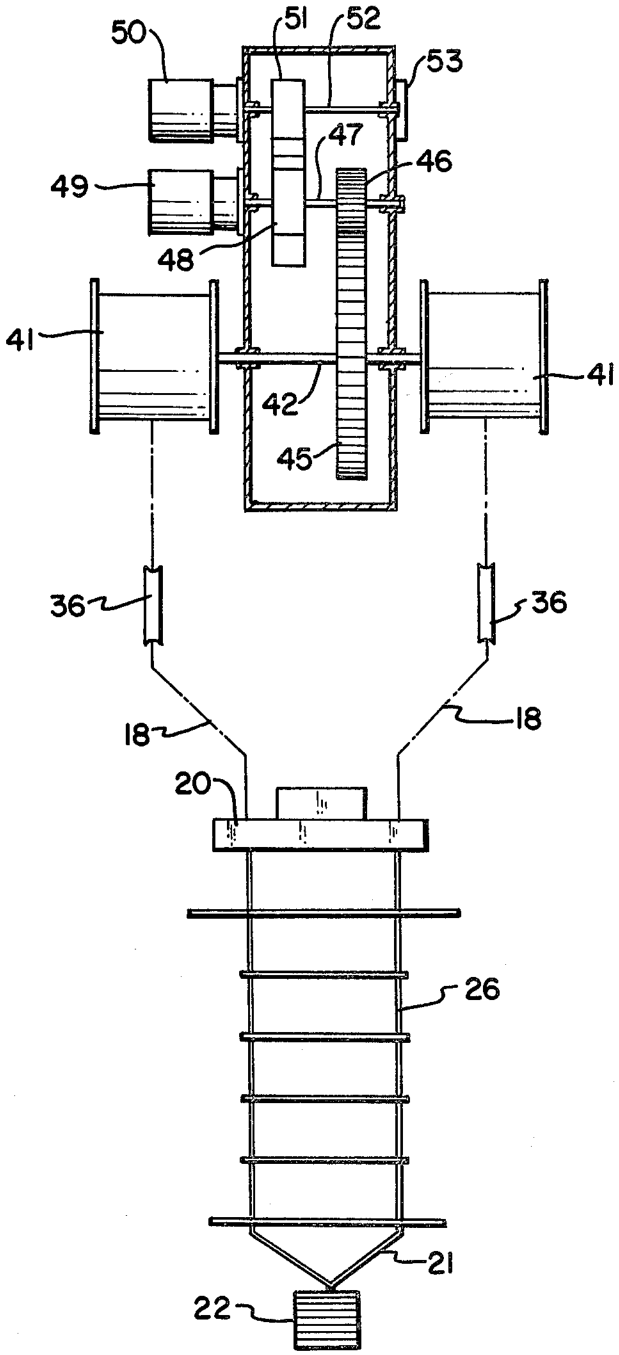
FIG. 2 is a schematic plan view of the mechanism of the invention shown in FIGS. 1*a* and 1*b*.
Figure 4:
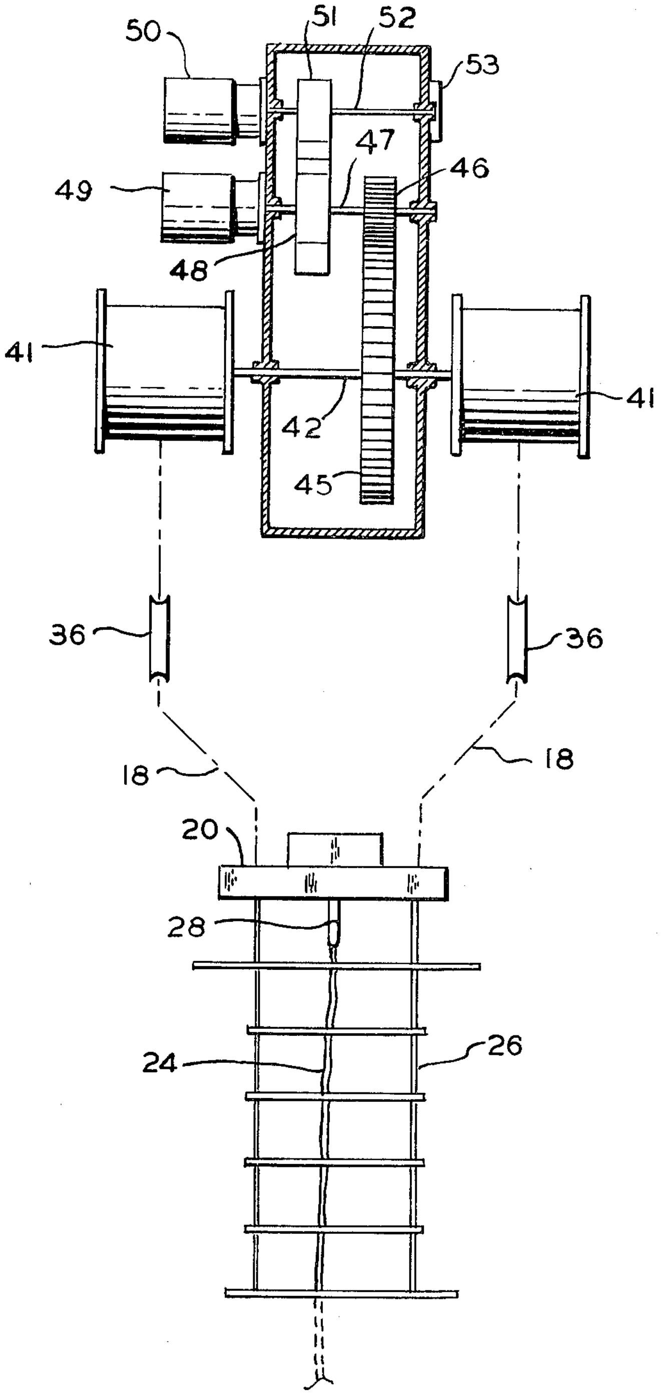
FIG. 4 is a schematic plan view of the mechanism of the invention shown in FIGS. 3*a* and 3*b*.

Now referring to FIGS. 2 and 4, the winch mechanism for the transfer apparatus of FIGS. 1*a* and 1*b* is shown in schematic view. Like components have been given the same designations for the sake of brevity.

A platform or gondola 20 is supported by two cables 18, which run over davit pulleys 36 to a pair of respective drums 41 connected by a rotatably mounted shaft 42. The shaft passes through and is affixed to a gear 45, which rotatably engages gear 46. A shaft 47 affixed to gear 46 is fixed to a roller coupling 48, and is continuously rotatably driven by a tensioning motor 49. The motor 49 will drive drums 41 via gears 46 and 45. The constant torque applied by the tensioning motor 49, allows the cables 18 to maintain a constant tension throughout the operation of the winch mechanism.

A hoisting reversible motor 50 is mounted adjacent tensioning motor 49, as illustrated. Hoisting motor 50 rotatably drives a hoisting gear 51 via rotatably mounted shaft 52. The drive gear 51 is operatively connected to tension gearing 46 and 45, through the roller coupling 48. Tensioning motor and hoisting motor are actuated by switch 35 or control panel 31 (FIG. 1*b*).

A brake 53 is connected to shaft 52 to stop the action of the rotation of the hoisting drive gear 51 when required.

OPERATION OF THE INVENTION

When the launch 10 pulls alongside of the tanker 14 in order to discharge passengers, the gondola 20 is lowered towards the fluctuating deck 25 of the launch 10, by operating the hoisting motor 50. This is accomplished by an operator at control panel 31 (FIG. 1*b*) or, alternatively, from the gondola, at switch 35 or by the passenger operating switch 62. Reversible motor 50 is operated in a reverse mode in order to lower the gondola 20 towards the deck 25 of the launch 10. As the gondola 20 is being lowered, the motor 49 is acting against motor 50.

In the forward or lifting mode, the motor 50 will act in concert with motor 49.

As the gondola 20 approaches the fluctuating deck 25 of the launch 10, deckhands on the launch 10 pull on rope 23 to guide the weight 22 toward an appropriate spot on the deck 25, as depicted in FIG. 1*a*. When the weight 22 lands on deck 25, the operator of the winch mechanism deactivates the hoisting motor 50. The brake 53 is inactive. Alternatively, a deckhand on launch 10 attaches the slack line 24 (FIG. 3*a*) to quick-release hook 28. When the line 24 is attached to the gondola 20, the operator of the winch mechanism deactivates the hoisting motor 50. The brake 53 is inactive. The continuously running tensioning motor 49 lifts the gondola 20 and tautens the line 24. The transfer apparatus is now in a balanced motion mode, having previously been in a hoisting mode, i.e. being lowered via hoisting motor 50. The deck hands may secure the weight to deck bitts, if necessary to prevent it from sliding, by means of rope 23.

In the balanced motion mode, the gondola 20 will follow the fluctuations of the deck 25. This balanced motion is a result of the constant tension being put on cables 18 via the continuously running tensioning motor 49. The weight 22 resting on the deck 25 will rise and fall with the respective upward and downward motion of deck 25. Alternately, the tension in line 24 will increase and decrease with the respective downward and upward motion of deck 25. As launch 10 drops, it places more force on cable 18, causing motor 49 to pay out more cable 18 until the tension in cable 18 returns to its previous magnitude. The gondola 20 will, therefore, drop as a consequence of the dropping deck 25.

When the deck rises, cable 18 experiences less tension, and motor 49 will take in more cable 18, in order to maintain the same tension magnitude. Thus, as the deck 25 rises, so will the gondola.

In this fashion, the gondola will continuously track the motion of the fluctuating deck 25.

As passengers or personnel climb onto the gondola 20 via ladder 26, a greater tension will be felt in cable 18, which tension will be adjusted for by a reduction of tension in cable 21 or, alternately, line 24, thus always keeping the gondola in synchronous motion with the fluctuating motion of the deck 25.

When all the personnel are on board the gondola 20, switch 35 is thrown to engage the hoist drive gear 51. Alternately, quick-release hook 28 is opened to release line 24. Motor 50 is now operated in the forward or lifting mode. The quick-release hook 28 may also be used to rapidly disconnect the gondola 20 and launch 10 in case of an emergency.

The balanced motion of the gondola will allow for easy embarcation to or disembarcation from the gondola, despite the vagaries and oscillations of the launch as it pitches in the sea.

Many modifications and changes will naturally occur to the skilled practitioner of this art. Therefore, the drawings, while depicting the best mode of this invention, are only meant to convey an exemplary teaching.

Having thus described the invention, what is desired to be protected by Letters Patent is presented by the following appended claims.

What is claimed is:

1. A personnel transfer system, comprising a personnel carrier;
a first means associated with said personnel carrier for operating said personnel carrier in a substantially motion balanced mode when said carrier is disposed upon a launch, wherein said personnel carrier will follow the fluctuating motion of said launch as it moves up and down in the sea;
second means associated with said personnel carrier for operating said personnel carrier in a hoisting mode for lowering or lifting said personnel carrier;
switching means associated with said first means and said second means for switching said personnel carrier between said substantially motion balanced mode and said hoisting mode; and
said first means including means extending between the personnel carrier and the launch for applying an increased downward load on said personnel carrier when said personnel carrier assumes a position greater than desired above said launch, and to remove said increased downward load when said personnel carrier assumes the desired position above said launch.

2. The personnel transfer system of claim 1, wherein said first means includes a continuously running tensioning motor.

3. The personnel transfer system of claim 2, wherein said second means includes a reversible motor.

4. The personnel transfer system of claim 3, wherein said switching means includes a coupling means disposed between said first means and said second means.

5. The personnel transfer system of claim 1, wherein said personnel carrier comprises a cable supported gondola.

6. The personnel transfer system of claim 1, wherein said personnel carrier includes a ladder.

7. The personnel transfer system of claim 1, wherein said downward load applying means includes a line secured between the launch and the bottom of said personnel carrier.

8. The personnel transfer system of claim 1 wherein said downward load applying means includes a weight suspended on a line extending below said personnel carrier.

9. A personnel transfer apparatus for transferring personnel to and from the deck of a launch, from and to the deck of a larger vessel, comprising:
carrier means for receiving personnel from the deck of said launch when said carrier means has been lowered from said vessel to the deck of said launch;
hoisting means operatively connected to said carrier means and associated with said vessel deck for operating said carrier means in a hoisting/lowering mode, whereby said carrier means and any personnel thereon can be lowered to or lifted from, the deck of said launch;
motion balancing means operatively connected to said carrier means for keeping said carrier means in a motion balanced mode when said carrier means has been lowered adjacent to the deck of said launch, said motion balancing means including a suspended weight means extending between the gondola and the launch for applying an increased downward load on said gondola when said gondola assumes a position greater than desired above the deck of said launch, and to remove said increased downward load when said gondola assumes the desired position above the deck of said launch, whereby said carrier means will substantially follow the fluctuating motion of said launch as said launch is caused to pitch under the influence of the sea; and
switching means associated with said hoisting means and said motion balancing means for switching said carrier means between said motion balanced mode and said hoisting mode.

10. The personnel transfer apparatus of claim 9 wherein said carrier means includes a cable supported gondola.

11. The personnel transfer apparatus of claim 9 wherein said carrier means includes a ladder.

12. The personnel transfer apparatus of claim 9 wherein said carrier means is connected to said hoisting means by at least one cable.

13. The personnel transfer apparatus of claim 12 wherein said carrier is connected to said hoisting means by two cables, and further wherein said hoisting means is provided with two davits for respectively suspending said cables.

14. The personnel transfer apparatus of claim 9 wherein said hoisting means includes a reversible motor for lowering or lifting said carrier means.

15. The personnel transfer apparatus of claim 14 wherein said motion balancing means comprises a continuously running tensioning motor.

16. The personnel transfer apparatus of claim 15 wherein said switching means includes a coupling device disposed between said hoisting motor and said tensioning motor.

17. A personnel transfer system, comprising a personnel carrier;
a first means associated with said personnel carrier for operating said personnel carrier in a substantially motion balanced mode when said carrier is disposed upon a launch, wherein said personnel carrier will follow the fluctuating motion of said launch as it moves up and down in the sea;

said first means including a suspended weight means extending between the personnel carrier and the launch for applying an increased downward load on said personnel carrier when said personnel carrier assumes a position greater than desired above the deck of said launch, and to remove said increased downward load when said personnel carrier assumes the desired position above the deck of said launch;

second means associated with said personnel carrier for operating said personnel carrier in a hoisting mode for lowering or lifting said personnel carrier; and switching means associated with said first means and said second means for switching said personnel carrier between said substantially motion balanced mode and said hoisting mode.

18. The personnel transfer system of claim 17 wherein said first means includes a continuously running tensioning motor.

19. The personnel transfer system of claim 17 wherein said second means includes a reversible motor.

20. The personnel transfer system of claim 17 wherein said switching means includes a coupling means disposed between said first means and said second means.

21. The personnel transfer system of claim 17 wherein said personnel carrier comprises a cable supported gondola.

22. The personnel transfer system of claim 17 wherein said personnel carrier comprises a ladder.

* * * * *